F. S. SNYDER.
PIPE BALL.
APPLICATION FILED FEB. 12, 1918.
1,276,585.
Patented Aug. 20, 1918.
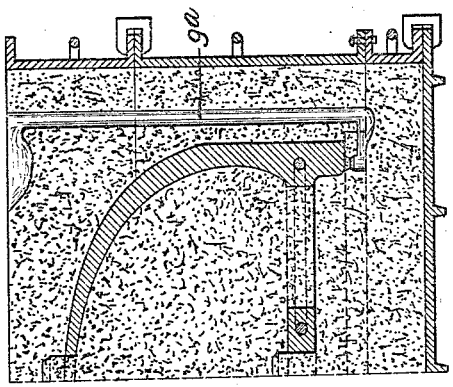
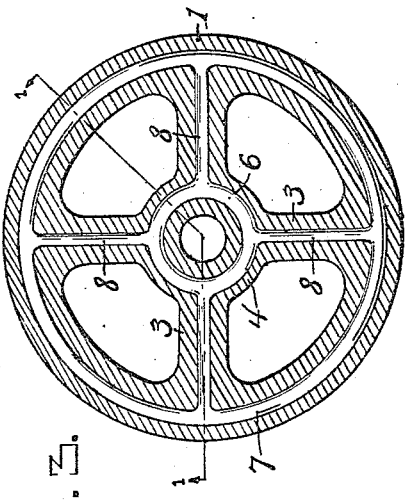
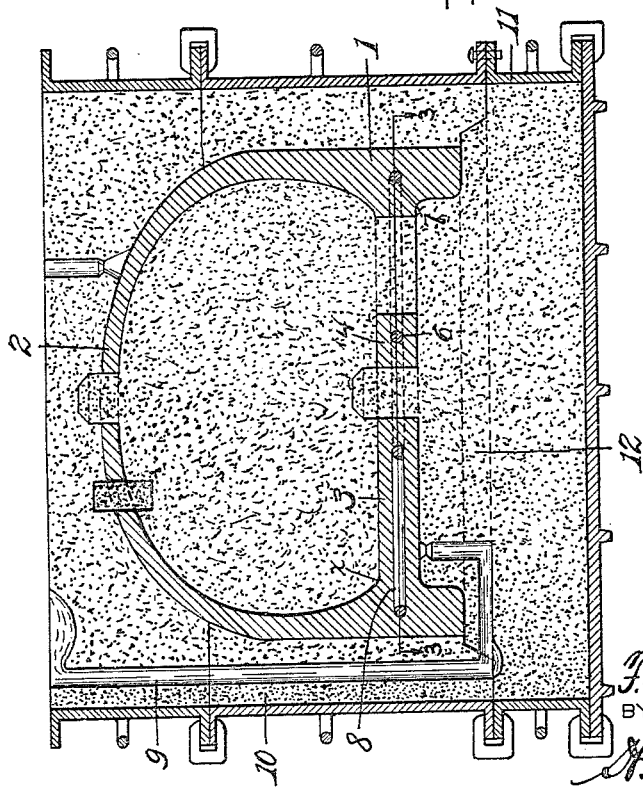
INVENTOR
F. S. Snyder
BY
ATTORNEY

UNITED STATES PATENT OFFICE.

FREDERICK SOLOMON SNYDER, OF NEW KENSINGTON, PENNSYLVANIA.

PIPE-BALL.

1,276,585.   Specification of Letters Patent.   Patented Aug. 20, 1918.

Application filed February 12, 1918. Serial No. 216,715.

*To all whom it may concern:*

Be it known that I, FREDERICK SOLOMON SNYDER, a citizen of the United States of America, and resident of New Kensington, county of Westmoreland, and State of Pennsylvania, have invented certain new and useful Improvements in Pipe-Balls, of which the following is a specification.

This invention relates broadly to pipe balls, and it has specific reference to a novel construction of mandrel-like ball of that type over which, in the manufacture of drawn-metal pipe, the metal is drawn, and which, in the manufacture of welded pipe, sustains the welding pressure of the usual welding rolls.

The primary object of the invention is to provide a reinforcing element for pipe balls which is designed to serve as a chill and which materially reduces shrinkage strains developed during the casting process in which the ball is made, effectually preventing fractures which would otherwise result.

With this and other important objects in view, the invention resides in the features of construction, arrangement of parts and combinations of elements which will hereinafter be fully described, reference being had to the accompanying drawings, in which—

Figure 1 is a central vertical section of a pipe-ball embodying the invention and of one form of molding flask in which it is made, illustrating the process of manufacture;

Fig. 2 is a similar partial section illustrating a slightly different form of pouring gate employed in the manufacture of the invention; and—

Fig. 3 is a horizontal section of the pipe ball, taken on line 3—3, Fig. 1, and disclosing therein the line 1—1 on which the sectional view shown in Fig. 1 is taken.

In said drawings, like designating characters distinguish like parts throughout the several views.

The pipe ball comprises a substantially cylindrical body 1 having a crown, or crown-like front end, 2 and an integral cross-head, the latter being located adjacent to the butt-end of the body 1 and being adapted to assist said body in resisting the strains imposed by the pressure-exerting welding rolls which are commonly employed. Said cross-head consists of a centrally disposed hub-like member 4 and radial arms 3 extending from said hub to said body. Embedded within and occupying the plane of the center line of said cross-head is a reinforcing element composed of soft wrought-iron or wire and comprising concentric rings 6 and 7, the inner of which is disposed centrally within the circular hub member 4 and the outer of which is located centrally within the heavy walls of the body 1. Radial spoke-like members 8 located centrally within the radial arms 3 connect said rings 6 and 7, as shown. Said rings 6 and 7 and said members 8 are composed of rods or wires of suitable gage, preferably round in cross section, which are preferably welded together at the points of intersection to provide a unitary member of relatively rigid construction, as shown in the drawings.

The walls of the butt end of the ball or casting are much heavier than are required in the dome or crown 2, said walls gradually diminishing in thickness from said butt end to the center of the crown.

Preliminary to pouring of the metal in the casting process in which the pipe ball is made, the reinforcement is supported by any suitable means, as by the staples commonly employed for such purposes in molding. In casting balls having a diameter of twelve or more inches the poured metal enters through a gate 9 which first extends vertically downward through the mold cope sand 10 contained by the flask to the level of the top of the drag mold 11, thence extends horizontally on said level through the drag core 12, and thence rises vertically through the last-mentioned core to the molding space at a point located inward with respect to the wall-casting space, as shown in Fig. 1. When balls having a diameter of less than twelve inches are being cast, the pouring gate 9ª terminates in a vertically rising portion which communicates with the bottom of the wall-casting space, as shown in Fig. 2.

Due to the more rapid cooling of the metal which occurs in the relatively lighter walls of the crown 1 of the casting, unequal shrinkage strains are set up which tend to produce fractures, particularly at the points of juncture of the heavy radial arms 3 with the heavy walls of the casting, indicated by the letter $x$. This tendency is largely overcome, if not effectually resisted, by the reinforcement described, which, serving as a chill, not only takes up the shrinkage, or reduces the shrinkage strains in the centers of the heavier portions of the casting, but also affords increased strength for resisting such strains as occur. Further, by reason of the strain resistance afforded, a reduction of the risers required is permitted which results in a practical elimination of waste of metal. Additionally, the gate of the mold is caused to feed with increased freedom, insuring the production of a casting which is solid, or free from blow-holes.

The casting with the embedded reinforcement possesses the slight elasticity which is requisite to enable it to withstand successfully such expansion and contraction as results from the reheating and subsequent cooling to which the casting is subjected in annealing and quenching treatments.

The position occupied by the outer ring 7 of the reinforcing element is such with respect to the wearing surface of the casting that frequent regrinding of said surface may be performed without exposing said ring.

What is claimed is—

1. A pipe ball comprising a hollow conoidal body having an integral pressure-sustaining cross-head located adjacent to the butt-end thereof, and a cross-head reinforcing element having an outer annular portion, the main part of said element being embedded in said cross-head and said annular portion being embedded in the adjacent walls of the body.

2. A pipe ball comprising a body of hollow conoidal form, the walls of said body gradually increasing in thickness from its dome-like end toward its butt end, an integral cross-head located adjacent to said butt end, and a reinforcement embedded in said cross-head and in the adjacent walls of the body.

3. A pipe ball comprising a hollow body of conoidal form, the walls of said body being of relatively greater thickness at its butt end than at its dome-like end, an integral cross-head located adjacent to said butt end, said cross-head consisting of a hub portion and radial arms extending from said portion to said body, and a reinforcement embedded in said cross-head and the adjacent walls of said body.

4. A pipe ball comprising a hollow cast-metal body of conoidal form, the walls of said body being gradually increased in thickness from its dome-like end toward its butt end, an integral cross-head located adjacent to said butt end, said cross-head consisting of a hub portion and radial arms extending from said portion to said body, and a reinforcement consisting of inner and outer rings embedded, respectively, in said hub portion and said body, and radially disposed members connecting said rings and embedded in said arms.

5. A pipe ball comprising a hollow cast-metal body of conoidal form, the walls of said body being gradually increased in thickness from its dome-like end to its butt end, an integral cross-head of spider form located adjacent to said butt end, and a reinforcement embedded in said cross-head and the adjacent walls of said body, said reinforcement having a form which substantially corresponds to that of said cross-head.

6. A pipe ball comprising a hollow cast-metal body of conoidal form, the walls of said body being gradually increased in thickness from its dome-like end to its butt end, an integral cross-head of spider form located adjacent to said butt end, and a reinforcement consisting of rod-like concentric rings and ring-connecting radial members disposed to lie centrally within said cross-head and the adjacent walls of said body.

In testimony whereof I affix my signature in presence of two subscribing witnesses.

FREDERICK SOLOMON SNYDER.

Witnesses:
GEORGE M. KELLY,
WILLIAM A. GLENSKY.